(12) United States Patent
Dang et al.

(10) Patent No.: US 7,929,251 B2
(45) Date of Patent: Apr. 19, 2011

(54) ASSEMBLY, APPARATUS AND METHOD FOR FABRICATING A STRUCTURAL ELEMENT OF A HARD DISK DRIVE AIR BEARING

(75) Inventors: Peter Dang, San Jose, CA (US); Eric W. Flint, San Jose, CA (US); Cherngye Hwang, San Jose, CA (US); Yongjian Sun, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 539 days.

(21) Appl. No.: 11/329,680

(22) Filed: Jan. 10, 2006

(65) Prior Publication Data
US 2007/0159723 A1     Jul. 12, 2007

(51) Int. Cl.
G11B 5/60      (2006.01)
B44C 1/22      (2006.01)

(52) U.S. Cl. ....... 360/236.6; 216/22; 216/41; 29/603.15

(58) Field of Classification Search .................... 216/22, 216/40, 41, 66; 430/311, 313, 317, 319; 204/192.34, 192.35, 192.37; 29/603.15, 29/603.18, 424, 603.16; 360/235.1, 235.2, 360/235.8, 236.6
See application file for complete search history.

(56) References Cited

U.S. PATENT DOCUMENTS

| | | | |
|---|---|---|---|
| 5,159,508 A | 10/1992 | Grill et al. | |
| 5,271,802 A * | 12/1993 | Chang et al. | 216/22 |
| 5,805,380 A | 9/1998 | Ishihara et al. | |
| 5,841,608 A | 11/1998 | Kasamatsu et al. | |
| 5,930,077 A | 7/1999 | Obata et al. | |
| 5,985,163 A | 11/1999 | Cha et al. | |
| 5,999,368 A | 12/1999 | Katayama | |
| 6,040,958 A | 3/2000 | Yamamoto et al. | |
| 6,074,566 A * | 6/2000 | Hsiao et al. | 360/125.42 |
| 6,120,694 A | 9/2000 | Kasamatsu et al. | |
| 6,252,742 B1 | 6/2001 | Kameyama | |
| 6,416,935 B1 | 7/2002 | Hsiao et al. | |
| 6,507,458 B1 | 1/2003 | Miyagawa | |
| 6,529,346 B2 | 3/2003 | Otsuka | |
| 6,657,820 B2 | 12/2003 | Kohira et al. | |
| 6,717,772 B2 | 4/2004 | Otsuka et al. | |
| 6,728,069 B2 | 4/2004 | Otsuka et al. | |
| 6,793,778 B2 * | 9/2004 | Gador et al. | 204/192.11 |
| 2001/0022707 A1 | 9/2001 | Koishi et al. | |
| 2002/0008078 A1 * | 1/2002 | Hatamura et al. | 216/11 |

(Continued)

FOREIGN PATENT DOCUMENTS

JP     04286713 A  * 10/1992

(Continued)

OTHER PUBLICATIONS

English-machine translation of JP 2000-298968 A to Komuro et al., published on Oct. 24, 2000.*

(Continued)

Primary Examiner — William J Klimowicz

(57) ABSTRACT

An assembly, apparatus and method for fabricating a structural element of a hard disk drive air bearing. The method and apparatus provide an improved protective layer, an improved structural element consisting of a single layer of structural material, and a method consisting of applying the improved protective layer, applying a uniform layer of structural material, applying a resist layer, etching the structural material layer, and removing the resist layer.

9 Claims, 8 Drawing Sheets

U.S. PATENT DOCUMENTS

| | | | |
|---|---|---|---|
| 2002/0011460 A1* | 1/2002 | Seigler et al. | 216/22 |
| 2002/0089787 A1* | 7/2002 | Lu et al. | 360/235.1 |
| 2003/0197978 A1* | 10/2003 | Otsuka et al. | 360/235.1 |
| 2005/0201011 A1* | 9/2005 | Dill et al. | 360/126 |

FOREIGN PATENT DOCUMENTS

| | | | |
|---|---|---|---|
| JP | 6012615 | | 1/1994 |
| JP | 07093737 A | * | 4/1995 |
| JP | 08055320 A | * | 2/1996 |
| JP | 9212836 | | 8/1997 |
| JP | 2000298968 A | * | 10/2000 |

OTHER PUBLICATIONS

English-machine translation of JP 08-055320 A to Fukushima et al., published on Feb. 27, 1996.*

English-machine translation of JP 07-093737 A to Murai, published on Apr. 7, 1995.*

Bradley J. Knapp "Enhancement of Head-Disk Interface Durability by Use of Diamond-Like Carbon Overcoats on the Slider'S Rails" IEEE MAG vol. 30 N. 2, Mar. 1994, pp. 369ff.

* cited by examiner

**Improved Deposition Process
800**

Dispose Protective Layer.
801

Dispose Structural Layer.
802

Dispose Patterned Resist Layer.
803

Remove unwanted structural layer areas.
804

Remove patterned resist layer.
805

Remove certain protective layer areas.
806

FIG. 8

ASSEMBLY, APPARATUS AND METHOD FOR FABRICATING A STRUCTURAL ELEMENT OF A HARD DISK DRIVE AIR BEARING

TECHNICAL FIELD

The present invention relates to the field of hard disk drives. More specifically, embodiments of the present invention relate to an improved structural element on a surface of an air bearing and an improved method to produce the structural element in disk drives with sensing heads in close proximity to a moving media surface.

BACKGROUND

Hard disk drives are used in many computer system operations. In fact, many computing systems operate with some type of hard disk drive to store the most basic computing information, e.g., the boot operation, the operating system, the applications, etc. In general, the hard disk drive is a device, which may or may not be removable, but without which, some computing systems may not operate.

One basic hard disk drive model was developed approximately 40 years ago and in some ways resembles a phonograph type apparatus. For instance, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). The assembly consisting of the disks, HGAs, spindle, housing, and the other parts internal to the housing is called the Head Disk Assembly, or HDA.

In operation, the hard disk is rotated at a prescribed speed via a spindle motor assembly having a central drive hub. Additionally, there are data holding channels or tracks spaced at known intervals across the disk. Most current embodiments arrange the data holding regions in concentric circular tracks, but other designs, such as spirals or irregular closed or open paths are possible and useful. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Refinement of the disk and the head have provided reductions in the size of the hard disk drive. For example, the original hard disk drive had a disk diameter of 24 inches. Modern hard disk drives are much smaller and include disk diameters of less than 2.5 inches. Small disk drive type apparatus such as micro drives can be smaller still. Refinements also include the use of smaller components and laser and other optical related components within the head portion. Reducing the read/write tolerances of the head portion allows the tracks on the disk to be reduced in size by a corresponding margin. Thus, as modern laser and other electro-optical and other micro recognition technologies are applied to the head, the track size on the disk can be further compressed.

The ever increasing need for data storage has led some disc drive makers to steadily increase the amount of data stored on a drive. Mechanical considerations, radiated audible noise limits, power requirements, and other factors limit the number of discs that can be economically combined in a single drive. Thus, disc drive technology has generally focused on increasing the amount of data stored on each disc surface.

Typically, data tracks are arranged concentrically about a disk's surface or in an analogous arrangement. One method of increasing the amount of data a disk can store is to make each data track narrower, which allows the tracks to be spaced more closely together. This allows a larger number of tracks on each disk surface. But, as tracks become narrower, signals generated in the head caused by media alterations (e.g., from data written to the disk'magnetic, optical, thermal, and/or other media) become more difficult to detect. Thus, the signal to noise ratio can worsen, particularly in the presence of electronic and media-induced signal degradation and noise.

One method to improve the signal to noise ratio, and hence the detection of media alteration (e.g., "writing"), is to position the heads more closely to the media surface. This causes the media alteration-sensing components of the head to be physically closer to the media alterations, thus improving the head sensor' ability to detect the media alterations comprising the written signal. However, care must be taken to avoid unintended contact between the head components and the moving media surface.

Typically, the heads are lightly spring loaded, with the spring tension perpendicular to the media surface plane and directed against the media surface. An air bearing separates the head and media surfaces as follows: As the media moves relative to the head, air is dragged by the disc surface through specifically designed channels in the surface of the head adjacent to the media surface.

The surface of the head and the channels contained therein, collectively referred to as the air-bearing surface (ABS), are designed to generate a regions of increased air pressure in between the ABS and media surface that forces the head away from direct contact with the media surface, in effect causing the head to fly above the media surface. The separation of the head ABS and media surface, commonly called fly height, is a complex phenomenon primarily a function of air density, the spring preload, the relative speed between the head and media surface, and the pattern of channels present on the head air bearing surface adjacent to the media surface.

Persons skilled in the design of disc drive heads recognize that lower fly heights requires physically smaller head sliders, plus tighter tolerances and greater precision on the dimensions of the slider and air bearing components. In addition, lower fly heights (closer head-disc separation) necessitate very tight control of the flatness and cleanliness of the air bearing surface to minimize the variance in fly height (e.g., population standard deviation of the fly height distribution) and reduce the probability of unwanted head-disc contact.

Many of the air bearing surface structural elements are pads, dams, foils, or other elements designed to direct and control air flow, mechanically support and position head components, provide features to support the head while the disc is not spinning hence the head is not flying, and many other functions. These elements typically consist of a structural material, which typically provides the physical size, strength, durability, and other qualities of the air bearing surface element feature. In addition to the structural material, other layers may be situated both above, e.g. towards the surface facing the media, and below, e.g. towards the slider body layer, the structural layers. These other layers provide corrosion resistive, adhesive, protective, electrical, and other qualities necessary to the head functions, e.g. electrical, mechanical, and aerodynamic properties.

Current air bearing surface technology often uses a "lift off" process to depose structural material, as exemplified in FIG. 1. FIG. 1 is an illustrative example of a lift off process material arrangement, and FIG. 2 exemplifies the structure of the resulting exemplary structural feature. The lift-off process is intended to depose a pattern of structural material having sides essentially perpendicular to a substrate (e.g., slider body) and a flat upper surface parallel to the substrate surface, i.e., a rectangular cross section in the view provided by FIG. 1.

The exemplary lift off process denoted in FIG. 1 uses a protective layer 2 deposited over the slider body substrate 1. Typically, the protective layer is composed of at least two discrete layers, usually a layer of silicon followed by a layer of carbon. Further, a patterned resist layer 3, typically photo resist, is deposited over the protective layer 2, covering the regions where the structural material 4 is not wanted, hence the remaining area constitutes the regions where deposition of the structural material is desired. The shape and perimeter features of said remaining area constitute the shape and perimeter features of the resulting structural element. Next, a layer of the structural material 4 used to construct the air bearing element is deposited over both the protective layer 2 and patterned resist layer 3, with an angle of incidence 7. Then the resist 3, along with the structural material 4 applied over it, are removed from the air bearing surface protective layer 2 by a stripping process, leaving the desired pattern of structural material 6 in FIG. 2. In many cases, the thickness of the structural material necessitates vigorous mechanical methods to break up and remove the undesired structural material and resist layer, such as a soda blast. This vigorous stripping process step may damage the protective layer 2, slider body 1, and any other features or components of the air bearing surface.

The structural element 6 typically contains at least one region 9 that was shadowed by resist 3, hence the height dimension is inadequate. The shadowing is a result of the angle of the deposition flux orientation resulting in regions where the structural material deposition flux is reduced, resulting in a subsequent reduced structural material accumulation. This is undesirable since any deviation from a flat surface represents a deviation from the model used to design the air bearing topography, resulting in unexpected air bearing performance.

In addition to the shadowing effect, the structural element 6 typically comprises at least one region 10 where the structural material 4 accumulated excessively along the resist pattern boundary, resulting in a protuberant region oriented toward the disc surface termed a "fence". This is undesirable since any deviation from a flat surface represents a deviation from the model used to design the air bearing topography. In addition, the fence is mechanically fragile and unstable so it tends to disintegrate during the disc drive operation.

In some existing lift off methods, multiple layers of protective, adhesive, and structural materials are deposed in succession, to avoid some of the shortcomings of the basic lift off method. In addition to the shadowing and fence effects, each of the multiple layers needed to construct the air bearing element adds uncertainty and error to the total height of the air bearing element, leading to unexpected air bearing performance.

The lift-off process produces undesirable side effects. In addition to an excessive number of process steps, many of the steps are potentially damaging to the air bearing structure. Of primary concern are the dimensional deviations from the desired dimensions of the applied structural material, caused by deposing the structural layer over the resist topology. The dimensional deviation results primarily from two sources: shadowing and fencing. Refer again to FIG. 1:

In the dimensional deviation caused by shadowing, the applied layer of structural material 6 does not possess a uniform thickness; since the relatively tall resist 3 areas shadow the areas near the patterned resist layer boundaries, e.g., Shadowed Region 5. This shadowing produces region 9, shown in FIG. 1 and again in FIG. 2 near the resist area boundaries that do not receive adequate structural material deposition flux to accumulate the needed thickness. The end result is a region, adjacent to the resist areas, where the applied structural layer 6 possesses inadequate height above the slider body; hence the structural element is not flat. It is also appreciated that this dimensional discrepancy is highly dependant on the photo resist layer thickness.

In the dimensional deviation caused by fencing, the applied layer of structural material 6 does not possess a uniform thickness. Some structural material deposition flux 7 deposits structural material along the sides and edges of the patterned resist boundaries. These deposits coat the resist boundary edges, illustrated by region 10, which are taller than the applied deposition of the structural element. When the resist is stripped away, exemplified in FIG. 2, the unwanted deposition of structural material 10 remains, forming a "fence" that extends above the thickness of the deposited element. Not only does this fence reduce the head-disc separation by an unpredictable amount, but the fence also lacks structural integrity and mechanical stability, so it tends to disintegrate during the disc drive operation. The fence may disintegrate into hard particulate matter, which is damaging and undesirable in the disc drive operation. In some instances, the head fabrication process may include an additional step, or sequence of steps, to remove the fence.

Further, the lift-off method requires an excessive number of manufacturing steps and processes, leading to increased costs and reduced production yields.

Further, the lift-off process will typically use a protective layer 2, which is needed to protect the slider body 1 from vigorous process steps (e.g., soda blast), corrosion and to enhance adhesion of subsequent layers. Presently used protective layers are too thick and opaque to permit measuring pole tip dimensions using the preferred method of critical dimension scanning electron microscopy (CDSEM). Furthermore, the protective layer requires two process steps to remove.

SUMMARY

Accordingly, what is needed is an air bearing manufacturing process that provides air bearing surface elements without dimensional deviations using fewer process steps. In addition, an improved protective layer is needed requiring fewer process steps and to allow critical dimension scanning electron microscopy.

An assembly, apparatus and method for fabricating a structural element of a hard disk drive air bearing is disclosed. The method and apparatus provide an improved protective layer, an improved structural element consisting of a single layer of structural material, and a method consisting of applying the improved protective layer, applying a uniform layer of structural material, applying a resist layer, etching the structural material layer, and removing the resist layer.

The method provides a protective layer, a structural material layer, a photo resist layer, removal of unwanted structural material layer, and removal of the photo resist layer.

An improved protective layer is disclosed. The improved protective layer is deposed between the slider body and the structural material layer.

BRIEF DESCRIPTION OF THE DRAWINGS

The accompanying drawings, which are incorporated in and form a part of this specification, illustrate embodiments of the invention and, together with the description, serve to explain the principles of the invention. These drawings depict exemplary embodiments and are not meant to limit the present invention. For instance.

FIG. 2 depicts an exemplary cross section of a portion of a hard disk air bearing at an intermediate manufacturing process step.

FIG. 8 is a flowchart of an exemplary process to depose an air bearing element according to an embodiment of the present invention.

DETAILED DESCRIPTION

An assembly, apparatus and method for fabricating a structural element of a hard disk drive air bearing is described herein. Reference is now made in detail to exemplary embodiments of the invention, examples of which are illustrated in the accompanying drawing figures. While the invention is described herein in conjunction with these exemplary embodiments, this description is not intended to limit the invention to these embodiments. On the contrary, the invention is intended to cover alternatives, modifications and equivalents, which may be included within the spirit and scope of the invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus, etc. have not been described in detail so as not to unnecessarily obscure aspects of the present invention. In particular it is appreciated that various quality assurance measurement steps and process monitoring measurement steps may or may not be applied at various points in the process.

Embodiments of the present invention provide a computer disk drive air bearing surface (ABS), a deposed structural element, and method for deposing the air bearing structural element. One embodiment provides an air bearing structural feature lacking dimensional deficiencies inherent in elements produced using prior art. One embodiment provides an improved protective layer comprising one layer. One embodiment comprises an improved protective layer that is easily removed via ion beam etch. One embodiment requires fewer process steps than current process and air bearing designs. One embodiment removes relationship between photo resist thickness and the dimensional accuracy of air bearing structural elements. One embodiment requires fewer and less expensive manufacturing process steps to construct the air bearing surface.

Therefore, embodiments of the present invention allow the ABS element to be effectively deposed without fencing and shadowing, with better control of air bearing element thickness, and using fewer process steps. Improved, e.g., more predictable, air bearing performance is provided according to embodiments of this invention. Dimensional discrepancies, head-disk contact and particulate contamination are deterred according to embodiments of the present invention. In addition, fewer fabrication process steps are required and overall head yield is improved.

Figure 1:
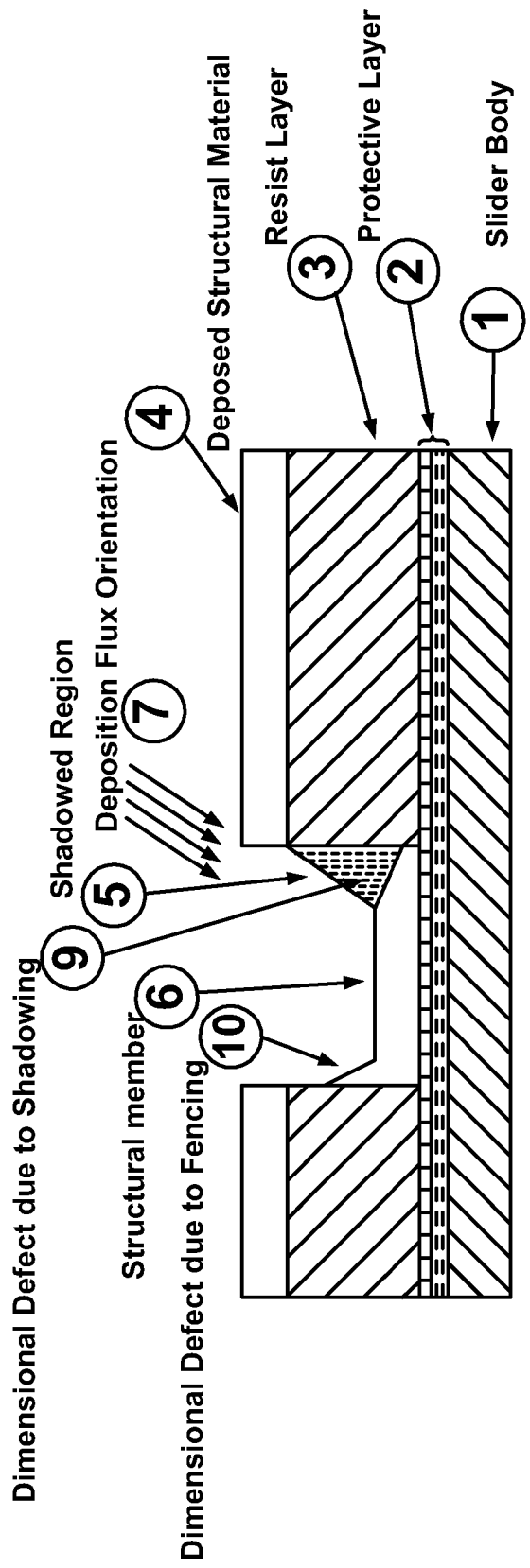
FIG. 1 depicts an exemplary cross section of a portion of a hard disk air bearing at an intermediate manufacturing process step.
Figure 2:
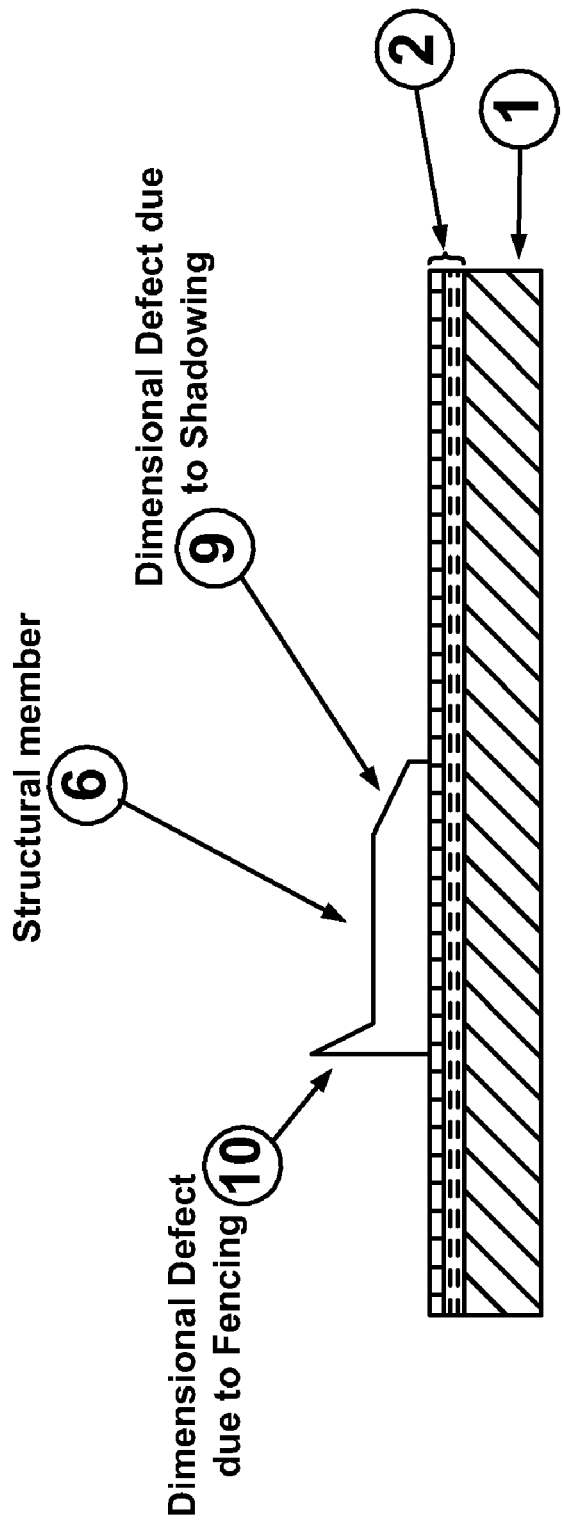
FIG. 2 is not to be interpreted as limiting the invention to magnetic disk drives. The drawings are not to scale.
Figure 3:
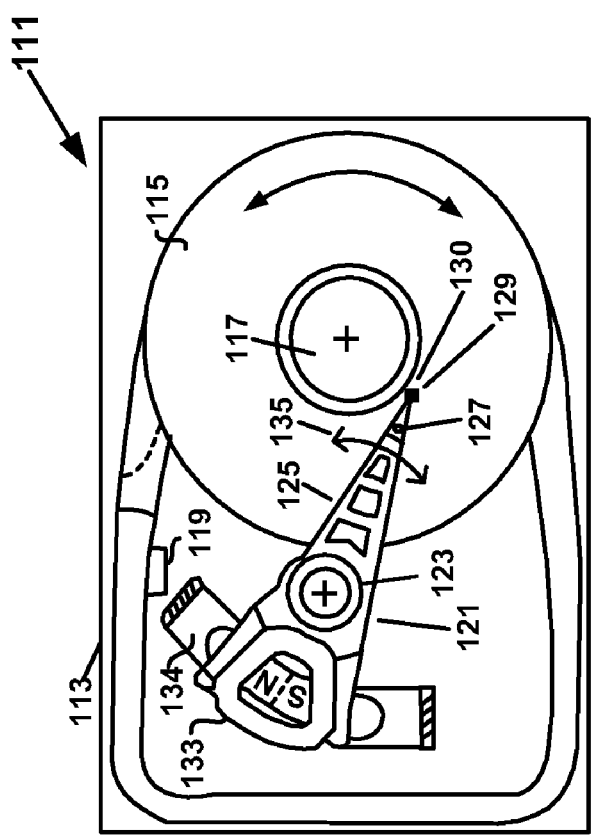
FIG. 3 depicts a hard disk drive in accordance with one embodiment of the present invention.

FIG. 3 depicts a hard disk drive or "file" 111 for storing data, in accordance with one embodiment of the present invention. While depicted and discussed with reference to exemplary magnetic media, file 111 can comprise optical or other media. File 111 has an outer housing or base 113 containing a disk pack having at least one disk 115, an actuator 121, several actuator arms 125, one of which is shown. Disk 115 comprises magnetic, optical, or other media. In one embodiment, actuator arms 125 are arrayed parallel to one another, e.g., in the form of a comb that is movably or pivotally mounted to base 113 about a pivot assembly 123. A controller 119 is also mounted to base 113 for selectively moving the comb of arms 125 relative to disk 115. The disk 115 is rotated by a spindle motor assembly having a central drive hub 117.

In the embodiment shown, each arm 125 has extending from it at least one cantilevered load beam and integrated lead suspension (ILS) 127. A read/write head slider 129 is mounted on the obverse of ILS 127 and secured to each ILS 127, e.g., on the obverse side of that depicted. The head slider has an air bearing surface 130 on the surface proximate and generally parallel to the disk surface (e.g., on the obverse of the side depicted). The level of integration called the head gimbal assembly (HGA) is the head slider 129, which are mounted on suspension 127. In one embodiment, the slider 129 is bonded to the end of ILS 127. It is appreciated that the ILS and cantilevered load beam 127 may comprise a wide variety of size, arrangement, and orientation, without affecting this invention. Embodiments of the present invention are well suited to ILS 127 having a variety of characteristics.

In one embodiment, ILS 127 has a spring-like quality, which biases or presses the air-bearing surface 130 against the disk 115 to cause the slider 129 to fly at a precise distance from the disk. ILS 127 has a hinge area that flexes, pivots, etc., to provide for the spring-like quality. A coil 133 is free to move within a magnet assembly 134, the top pole of which is not shown in this perspective. Coil 133 is mounted to arms 125 opposite the ILS 127. In one embodiment, coil 133 comprises a component similar to those referred to in the art as "voice coils." Movement 135 of the actuator 121 (depicted by an arrow) by controller 119 causes the head 129 to move along radial arcs across tracks on the disk 115 until the heads 129 settle on their set target tracks. In one embodiment, the heads 129 operate in a manner similar to that of others known in the art. In one such embodiment, the ILS 127 move in unison with one another. In another embodiment, file 111 uses multiple independent actuators, similar to those shown. In that alternate embodiment, the arms 125 are free to move independently of one another.

Figure 4:
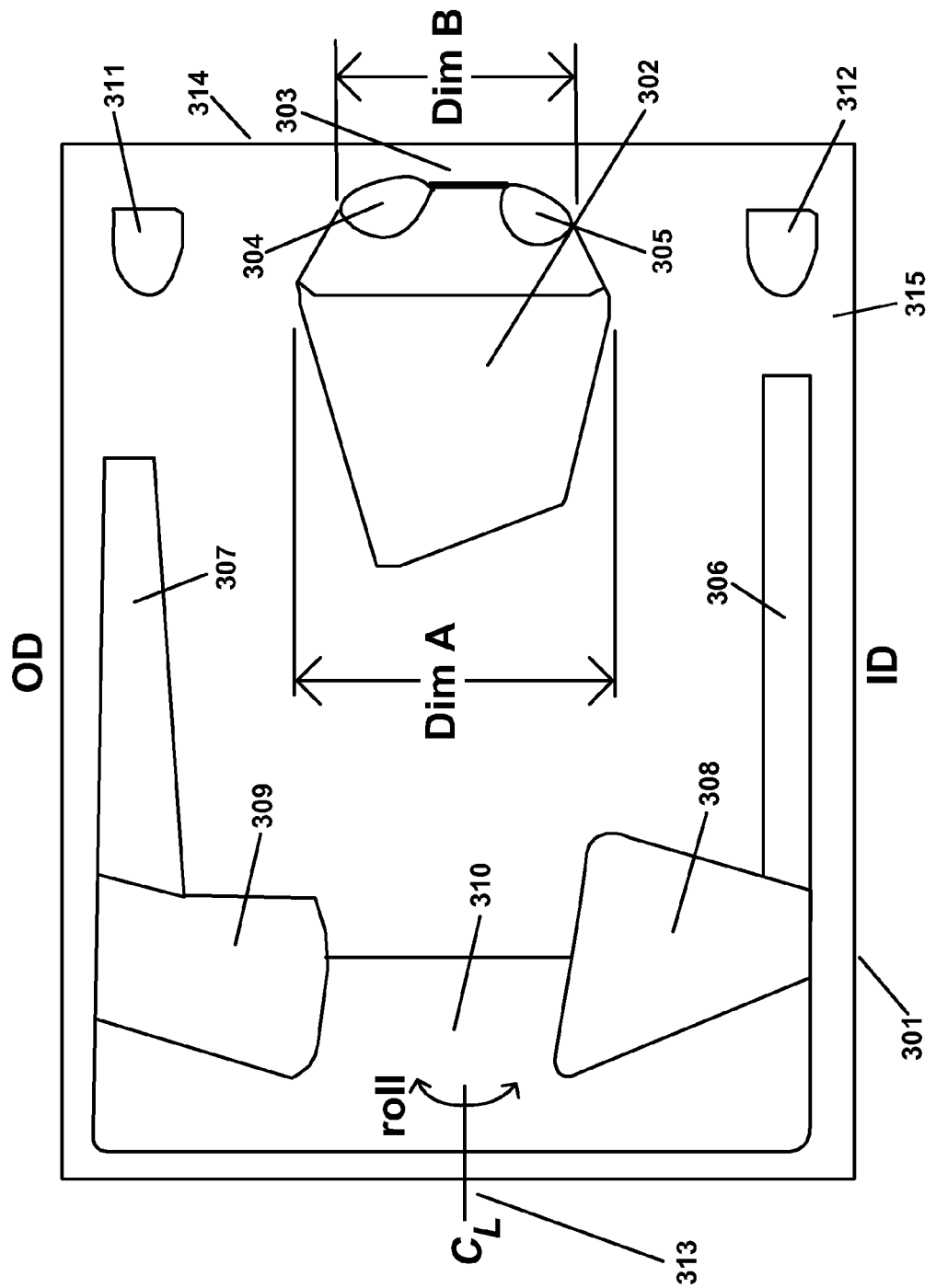
FIG. 4 depicts a disk drive head air bearing surface (ABS) showing structural elements in accordance with an embodiment of the present invention.

FIG. 4 depicts the air bearing surface 130 of slider 129 of file 111 of FIG. 3. The depicted surface faces the media, item 115 of FIG. 3. Slider body 301, upon which are disposed features, structural elements, and transducer elements is described as follows: In one embodiment, such features are deposed, deposited, etched, etc, over a protective layer 315 deposed above slider body 129. In one embodiment, such features and elements are deposed in accordance with an embodiment of the present invention. The leading edge 313 of slider 130 is proximate with air dam 310. The trailing edge 314 of slider 130 is proximate with pads 311 and 312, transducer 303, and pad area 304 and 305.

The structural elements consisting of a front air dam 310, rails 306 and 307, and air bearing structures 308, 309, 311, 312, and 302 establish an air pressure distribution formed by aerodynamic effects on air dragged, pulled, etc. under the slider 301 by relative motion between slider and media surface and related effects. Center structural element pad 302 also carries the transducer elements, collectively denoted with element number 303. The composition and/or layers comprising the transducer 303 in various embodiments can depend upon a particular intended application. However in one embodiment, the dimension of transducer 303 is independent of other slider features. Embodiments of the present invention are well suited to transducer 303 having a variety of characteristics.

Figure 5:
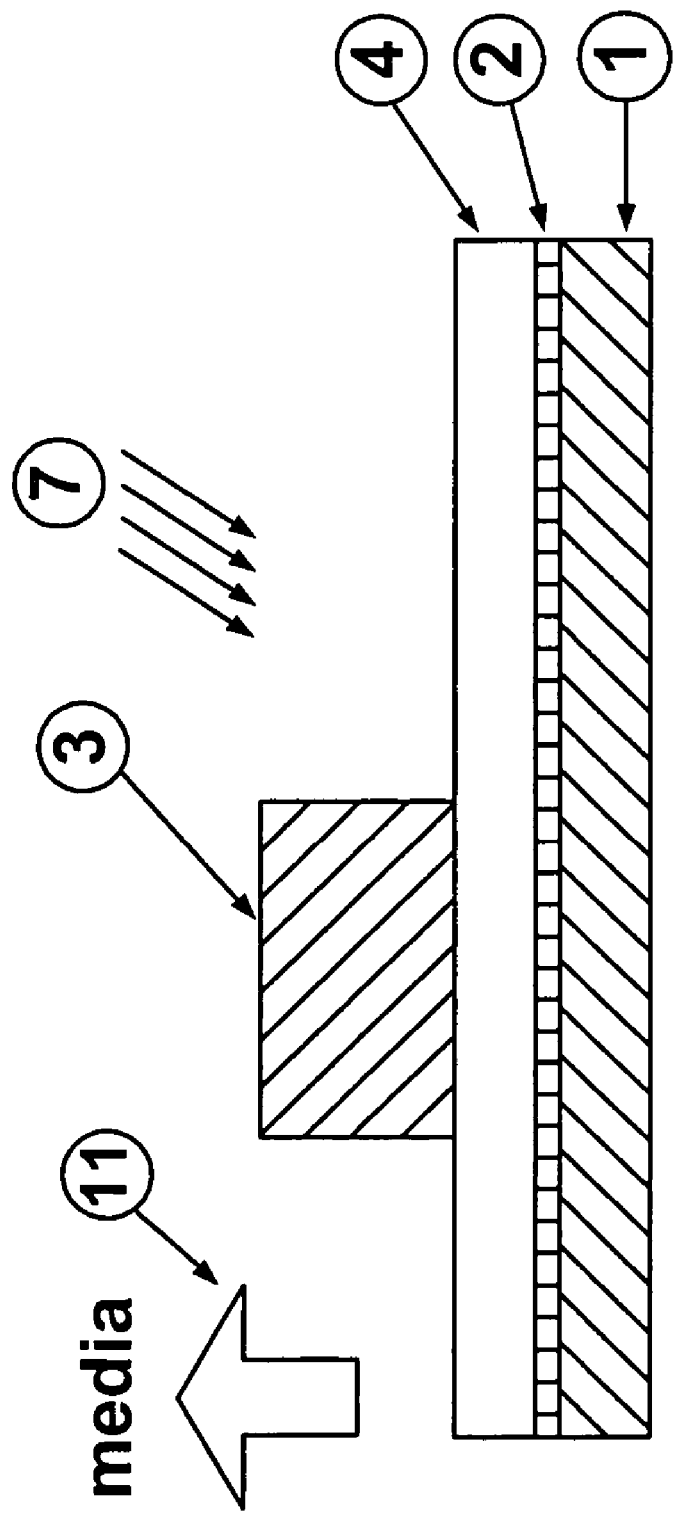
FIG. 5 depicts an exemplary cross section of a hard disk air bearing having an improved protective layer and improved structural element according to an embodiment of the present invention.

FIG. 5 depicts an exemplary air bearing feature cross section in accordance with an embodiment of the present invention. The air bearing structure is depicted at an intermediate point in an exemplary process in accordance with the present invention. The air bearing is oriented with a face proximate with the disk drive media surface, as denoted by arrow 11. Protective layer 2 is deposed over, i.e. towards the media face of the air bearing surface, slider body 1.

In one embodiment, the improved protective layer 2 is made of Si3N4. Si3N4 dielectric has these advantages: thin enough to allow critical dimension measurement by scanning electron microscope (CDSEM), resistant to chemical and mechanical treatments, applied via a single layer deposition, and easily removed by ion beam etch.

In one embodiment, an essentially uniform thick layer of structural material 4 is deposed over protective layer 2. Then resist material 3 is deposed in an appropriate pattern over structural layer 4. The pattern of resist material 3 is such to protect certain regions of structural material 4 from subsequent material removal process steps, thereby denoting and protecting the regions of structural material 4 that are to remain after the subsequent material removal steps.

In one embodiment, the structural material 4 is carbon, but the structural material functions equally well with a large number of other materials, hence it can be seen that carbon is not required as the structural material.

In one embodiment, the resist material 3 is a liquid photo resist. In one embodiment, the resist material 3 is a dry photo resist. It is appreciated that the type of resist may vary, depending on the slider manufacturing process and the materials used for the layers. It is also appreciated that the final thickness and topography of the structural element, item 12 of FIG. 5, is independent of the thickness or composition of the resist layer 3.

Figure 6:
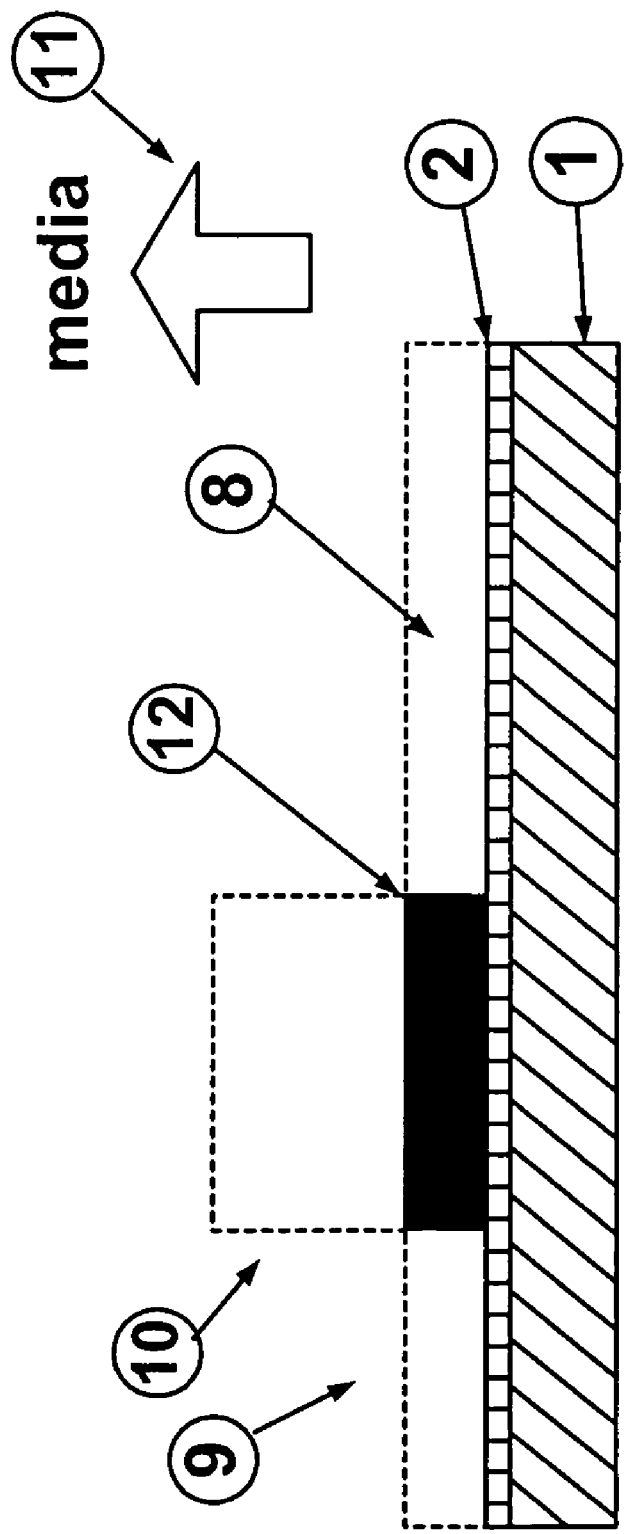
FIG. 6 depicts an exemplary cross section of a hard disk air bearing having an improved protective layer and improved structural element after oxygen-nitrogen ash and resist strip action according to an embodiment of the present invention.

FIG. 6 depicts an exemplary air bearing feature cross section in accordance with an embodiment of the present invention. The air bearing is oriented with a face proximate with the disk drive media surface, as denoted by arrow 11. Improved protective layer 2 is deposed over, i.e. towards the media face of the air bearing surface, slider body 1.

In one embodiment of the invention, reactive ion milling is used to remove the structural materials from regions 8 and 9, which were deposed as part of layer 4 in FIG. 5, that are not protected by the resist layer in region 10. In one embodiment of the invention, the resist layer in region 10 is removed by a resist strip process. It is recognized that the actual method used to remove structural materials in regions 8 and 9, and the method to remove resist layer in region 10 may vary, depending on the slider manufacturing process and the materials used for the layers. Embodiments of the present invention are well suited to a variety of structural material in regions 8 and 9, and resist region 10 removal methods.

Structural layer in regions 8 and 9, which had been deposed previously in the manufacturing process, are removed by the described process. The resist layer in region 10, which had been deposed previously in the manufacturing process, is removed by the described process. Therefore, structural element 12 remains and is effectively deposed over air bearing protective layer 2.

Figure 7:
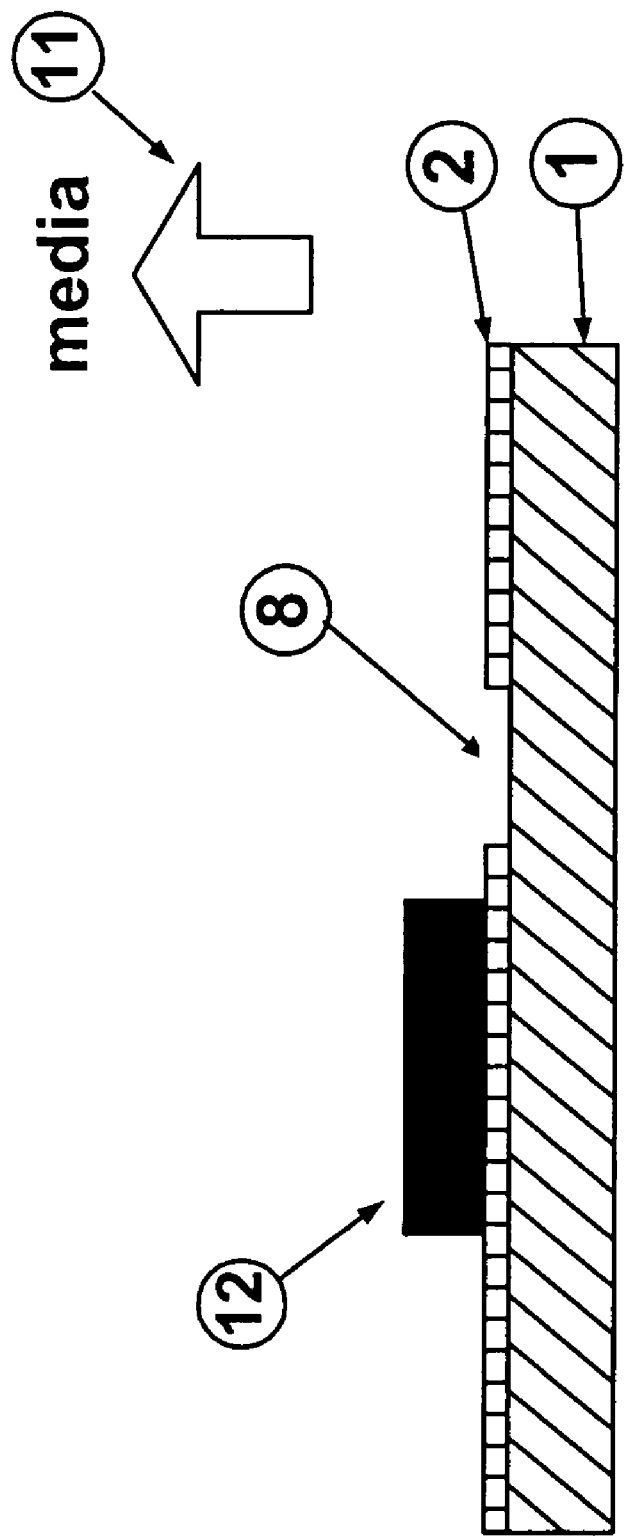
FIG. 7 depicts an exemplary cross section of a hard disk air bearing having an improved protective layer and improved structural element after a protective layer etch according to an embodiment of the present invention.

FIG. 7 depicts an exemplary air bearing feature cross section in accordance with an embodiment of the present invention. As in FIG. 6, the air bearing is oriented with a face proximate to the disk drive media surface, as denoted by arrow 11. Region 8 depicts a region where the improved protective layer 2 has been removed to form a shallow well. In one embodiment, the improved protective layer is removed by ion beam etching. Ion beam etching is inexpensive, easily controlled, and unlikely to damage the air bearing surface components.

FIG. 8 is a flow chart of an exemplary process for deposing a structural element on a disk drive air bearing, in accordance with an embodiment of the present invention.

Process 800 begins with Step 801, where the improved protective layer is deposed over the slider body.

In Step 802, a uniform layer of structural material is deposed over the protective layer.

In Step 803, a layer of photo resist is deposed over the structural material. In one embodiment, the pattern of the resist is such to mask the desired regions of the structural material layer so that the desired regions are not removed in Step 804, and hence remain attached to the protective layer.

In Step 804, the undesired portions of the structural material layer are removed. In one embodiment, the unwanted portions of the structural material layer are removed with oxygen-nitrogen reactive ion etching.

In Step 805, the resist layer is removed, leaving the structural element.

In Step 806, undesired areas of the lower protective layer are removed. In one embodiment, the undesired areas of the lower protective layer are removed with an ion beam etch.

While flow chart 800 shows a specific sequence of steps characteristic of one embodiment, other embodiments of the present invention are well suited to function with more or fewer steps. Likewise, the sequences of steps in various such embodiments can vary from those exemplified with process 800, e.g., depending upon the application. Specifically, quality control measurement steps and process monitoring steps may or may not be present at any step of the process.

In summary, embodiments of the present invention provide a method, apparatus, and assembly for a structural element of a hard drive air bearing surface. Embodiments of the present invention function to reduce the number of process steps required to fabricate the air bearing surface. Embodiments of the present invention function to eliminate fencing and/or shadowing inherent in the prior art thereby providing an air bearing structural element with planar upper surfaces and rectangular cross section. In these embodiments, head-disc separation bridges due to such fencing, which can lead to particulate contamination and rapid drive failure, is reduced.

Embodiments of the present invention, a method, apparatus, and assembly for a structural element of a hard drive air bearing surface, is thus described. While the present invention has been described with reference to particular exemplary embodiments, the present invention should not be construed as limited by such embodiments, but rather construed according to the claims appended hereto and their equivalents.

What is claimed is:

1. A method for fabricating a structure on a disk drive air bearing slider body, comprising:

disposing a protective layer above said slider body, wherein said protective layer mechanically and chemically protects said slider body, said protective layer resistant to chemical and mechanical treatments, applied via a single layer deposition, and removable with an ion beam etch;

disposing a structural layer above said protective layer;

disposing a patterned resist layer above said structural layer, such that said patterned resist layer is disposed over certain regions of said structural layer;

removing unwanted regions of said structural layer that are not protected by the resist layer during a first material removal process, thereby leaving certain regions of said structural layer, wherein said protective layer is not affected or removed during said first photo resist material removal process;

removing said patterned resist layer during a resist material removal process, such that a uniform protuberance with no fences, shadowed areas, or dimensional defects results, wherein said protective layer is not affected or removed during said resist material removal process; and removing certain regions of said protective layer utilizing an ion beam etch process, such that sub-etch regions are formed, wherein said sub-etch regions are defined by at least two unetched regions of the protective layer.

2. The method as recited in claim 1 wherein said disposing of said protective layer is done in a single deposition step.

3. The method as recited in claim 2 wherein said disposing of said protective layer comprises disposing a material selected from the group of Si3N4, Ti, Ta, TiN, TaW.

4. The method as recited in claim 1 wherein said disposing of said structural layer comprises disposing a single layer.

5. The method as recited in claim 4 wherein said disposing comprises disposing carbon.

6. The method as recited in claim 1 wherein said disposed patterns of said patterned resist layer denotes the regions of said structural layer to be retained after removing said unwanted structural layer areas.

7. The method as recited in claim 6 wherein said disposition of said patterned resist layer comprises disposing a liquid photo-resist material.

8. The method as recited in claim 6 wherein said disposition of said patterned resist layer comprises disposing a dry photo-resist material.

9. The method as recited in claim 1 wherein said removing of said unwanted regions of said structural layer comprises oxygen-nitrogen reactive ion etching.

* * * * *

UNITED STATES PATENT AND TRADEMARK OFFICE
CERTIFICATE OF CORRECTION

| | | |
|---|---|---|
| PATENT NO. | : 7,929,251 B2 | Page 1 of 1 |
| APPLICATION NO. | : 11/329680 | |
| DATED | : April 19, 2011 | |
| INVENTOR(S) | : Peter M. Dang et al. | |

It is certified that error appears in the above-identified patent and that said Letters Patent is hereby corrected as shown below:

Col. 9, Line 29, Claim 1, Delete "photo resist"

Signed and Sealed this
Thirty-first Day of May, 2011

David J. Kappos
*Director of the United States Patent and Trademark Office*